United States Patent [19]

Kuno et al.

[11] 4,012,948
[45] Mar. 22, 1977

[54] FUEL CONSUMPTION MEASURING DEVICE

[75] Inventors: Akira Kuno, Nagoya; Yoshio Shinoda, Okazaki; Hiroshi Arai, Toyota, all of Japan

[73] Assignees: Nippon Soken, Inc., Nishio; Toyota Jidosha Kogyo Kabushiki Kaisha, Toyota, both of Japan

[22] Filed: June 6, 1975

[21] Appl. No.: 584,497

[30] Foreign Application Priority Data

June 10, 1974   Japan ............................ 49-65788

[52] U.S. Cl. ............................ 73/113; 73/119 A
[51] Int. Cl.² ............................ G01M 15/00
[58] Field of Search .............. 73/113, 114, 119 A; 235/92 MP, 92 T, 151.21

[56] References Cited

UNITED STATES PATENTS

| | | | |
|---|---|---|---|
| 2,477,993 | 8/1949 | Lewis | 235/92 |
| 3,378,741 | 4/1968 | Sutton | 318/603 |
| 3,415,118 | 12/1968 | McQueen et al. | 73/113 |
| 3,466,517 | 9/1969 | Leenhouts | 318/603 |
| 3,549,868 | 12/1970 | Watson et al. | 73/114 |
| 3,593,097 | 7/1971 | Gebelein, Jr. | 318/603 |
| 3,812,710 | 5/1974 | Bauman | 73/114 |
| 3,873,814 | 3/1975 | Mirdadian | 235/92 |

*Primary Examiner*—Herbert Goldstein
*Attorney, Agent, or Firm*—Cushman, Darby & Cushman

[57] ABSTRACT

There is provided a fuel consumption measuring device wherein each time the fuel injection valve in a fuel injection system for an internal combustion engine is opened, a first pulse signal is generated whose pulse width corresponds to the duration of the opening of the valve, and the pulse width of the first pulse signal is measured to generate second pulse signals corresponding to the quantity of fuel fed, whereby an exact amount of the fuel consumed or remaining in the fuel tank is stored.

4 Claims, 13 Drawing Figures

FUEL CONSUMPTION MEASURING DEVICE

BACKGROUND OF THE INVENTION

1. Field of the Invention

The present invention relates to a fuel consumption measuring device whereby, for example, the fuel quantity consumed by an internal combustion engine of an automobile or the like is measured.

2. Description of the Prior Art

In a known type of fuel gauge for measuring the amount of fuel in the fuel tank, a float is provided in the tank so that the resistance value of a slide rheostat is varied in accordance with the position of the float and the amount of current flowing through the slide rheostat is detected by an ammeter to indicate the amount of fuel in the tank. A disadvantage of this type of fuel gauge is that when the vehicle is running along a slope or under acceleration or deceleration conditions, for example, the fuel level is caused to fluctuate and hence the float is also caused to fluctuate thus making it impossible to give an accurate indication of the fuel in the tank. Another disadvantage of this type of fuel gauge is that since this type of fuel gauge consumes considerable power, it is designed so that no indication of the fuel level is given when the main switch of the automobile is opened thus making it impossible for the driver to know the amount of the fuel in the tank at that time, whereas when the main switch is reclosed a certain amount of time is required before the fuel gauge can give an accurate indication of the fuel level.

SUMMARY OF THE INVENTION

It is the object of the present invention to provide a fuel consumption measuring device in which each time the fuel injection valve in a fuel injection system for an internal combustion engine is opened, a pulse signal is generated whose pulse width corresponds to the duration of the opening of the valve, whereby in accordance with the pulse signal the duration of the opening of the valve is measured and converted into the fuel quantity delivered, thus giving an accurate measurement of the fuel quantity consumed or the amount of fuel in the tank.

In accordance with the device of this invention, it is possible to reduce the amount of power consumption, and moreover even when the automobile is ascending or descending a slope or under acceleration or deceleration driving conditions, it is possible to give an accurate measurement of the fuel quantity consumed without being affected by such external factors.

DESCRIPTION OF THE PREFERRED EMBODIMENTS

The present invention will now be described in greater detail with reference to the illustrated embodiments.

Figure 1:
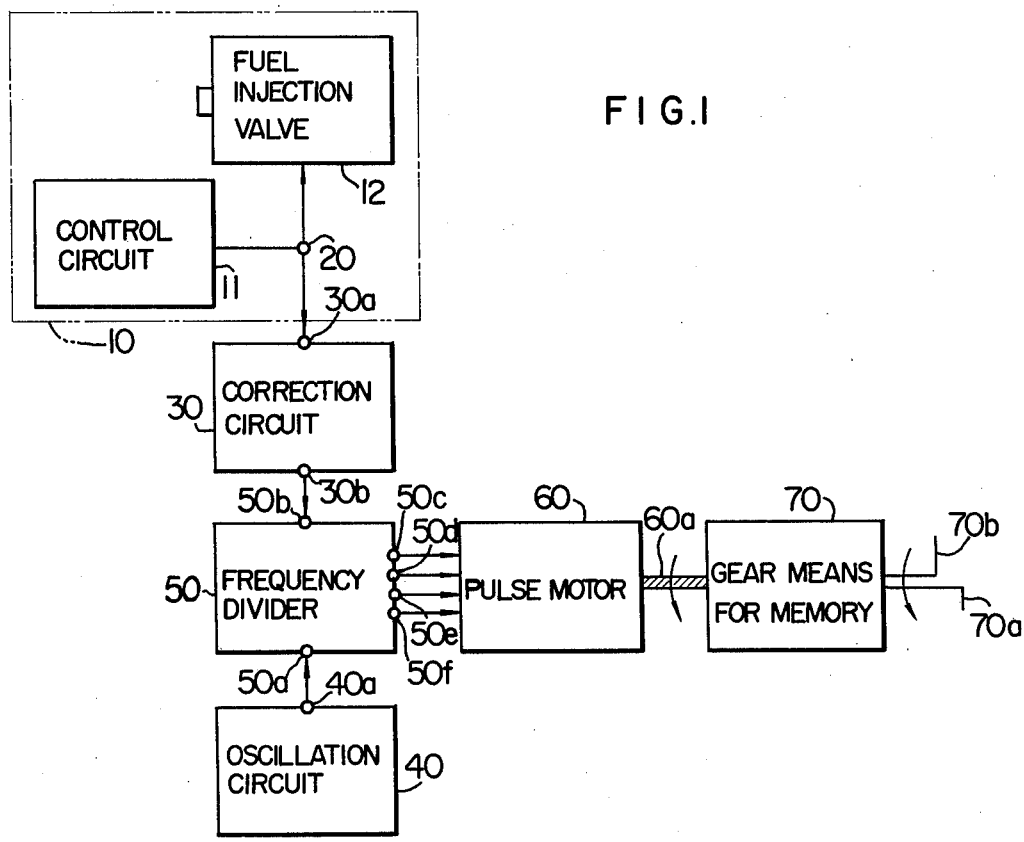
FIG. 1 is a block diagram showing an embodiment of a fuel consumption measuring device according to the present invention.

Referring first to the block diagram of FIG. 1 showing the general construction of an embodiment of a fuel consumption measuring device according to the invention, numeral 10 designates a known type of electronic fuel injection system (hereinafter referred to as an EFI) for computing the fuel requirements of an internal combustion engine installed in an automobile and metering the required fuel feed quantity, 11 a control circuit for detecting operating parameters of the engine and generating in synchronism with the rotation of the engine injection signals having a pulse width corresponding to the fuel requirement of the engine, 12 a fuel injection valve which is opened by the application of an injection signal to intermittently inject the fuel fed under pressure into the engine. Numeral 20 designates an externally attached terminal for taking off the injection signals, 30 a correction circuit including a delay circuit wherein the injection signal taken off from the external terminal 20 is applied to an input terminal 30a and the delay time in the operation of the fuel injection valve 12 is subtracted from the injection signal thus generating at an output terminal 30b a pulse signal corresponding to the duration of the opening of the fuel injection valve 12. The correction circuit 30 and the external terminal 20 constitute means responsive to every opening of the fuel injection valve 12 for generating a pulse signal having a pulse width corresponding to the duration of the opening of the fuel injection valve 12. However where the delay time in the operation of the fuel injection valve 12 can be ignored owing to the very small value of the delay time or the accuracy requirement is not so severe, the correction circuit 30 may be eliminated from; the pulse signal generating means which will then include only the external terminal 20 in which case the injection signal taken off from the external terminal 20 may be used as the required pulse signal. Numeral 40 designates an oscillation circuit for generating at its output terminal 40a conversion reference pulses of a predetermined frequency for digital computation purposes, 50 conversion frequency divider wherein the pulse signal applied to an input terminal 50b is modulated with the conversion reference pulses applied to an input terminal 50b so that each time the number of the applied conversion reference pulses reaches a predetermined number, a conversion pulse train including four pulses which are sequentially generated at output terminals 50c, 50d, 50e, and 50f is generated and in this way the applied pulse signal is converted into the fuel quantity delivered. The oscillation circuit 40 and the conversion frequency divider 50 constitute a conversion circuit whereby in accordance with the input pulse signal the duration of the opening of the fuel injection valve 12 is measured and converted into the fuel quantity delivered. This fuel quantity delivered represents the fuel quantity consumed. Numeral 60 designates a pulse motor of a four-phase twenty-pole type whose rotating shaft 60a is successively rotated stepwise by the above-mentioned conversion pulse train, that is, the rotating shaft 60a is rotated four steps in response to the applied conversion pulses for one cycle which include four pulses of different phases sequentially generated at the output terminals 50c, 50d, 50e and 50f of the conversion frequency divider 50, and one complete revolution of the pulse motor 60 consists of 20 steps. The frequency of the oscillation circuit 40 and the number of frequency dividing stages of the conversion frequency divider may be preset so that every revolution of the pulse motor 60 is equivalent to the fuel consumption of 10 cc, for example. Numeral 70 designates gear means for memory connected to the rotating shaft 60a and having its indicating auxiliary pointer 70a directly connected to the rotating shaft 60a to indicate the fuel consumption of 10 cc per revolution of the rotating shaft 60a and its indicating main pointer 70b connected to a shaft which is rotated 1/8000 of a revolution for every revolution of the rotating shaft 60a to indicate the fuel consumption of 60 liters per ¾ of a revolution of the shaft (i.e., 60 liters = 10 × 8000 × ¾ cc = 60 × $10^3$ cc).

Figure 2:
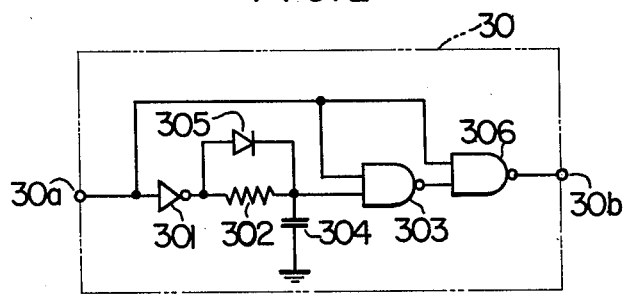
FIG. 2 is a circuit diagram showing the detailed construction of the correction circuit used in the embodiment of FIG. 1.
Figure 3:
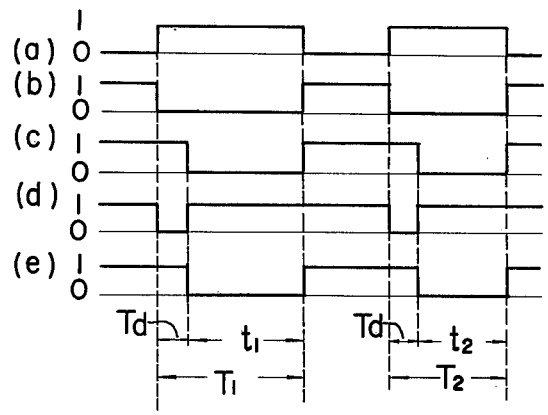
FIG. 3 is a diagram showing the waveforms generated at various points in the correction circuit shown in FIG. 2.

The operation and more detailed construction of the embodiment described above will now be described. FIG. 2 is a circuit diagram showing the detailed construction of the correction circuit 30, and FIG. 3 shows the waveforms generated at various points in the correction circuit 30. Referring now to FIGS. 2 and 3, FIG. 3a shows the voltage waveform of the injection signals applied to the input terminal 30a, and the application of such injection signals results in the generation of the output waveform shown in FIG. 3b at the output of a NOT gate 301 connected to the input terminal 30a. The output terminal of the NOT gate 301 is connected to one input of a NAND gate 303 through a delay time presetting resistor 302 and this input is also connected to one end (positive terminal) of a delay time presetting capacitor 304 whose other end (negative terminal) is grounded. A quick charging diode 305 is connected in parallel with the resistor 302. Consequently, the voltage waveform shown in FIG. 3c is applied to the one input of the NAND gate 303 and thus the 0 level pulse having the time width Td as shown in FIG. 3d is generated at the output terminal of the NAND gate 303 since its other input is connected to the input terminal 30a. The output signal of the NAND gate 303 is applied to one input of NAND gate 306 so that the delayed signal or the pulse signal shown in FIG. 3e is generated at the output terminal 30b of the NAND gate 306 since its other input is connected to the input terminal 30a. In this case, the value of the time width Td has been preset to 0.45 msec, for example, and this in fact represents the delay time in operation corresponding to the difference between the pulse width of the injection signal applied from the EFI 10 to the fuel injection valve 12 and the fuel injection quantity corresponding to the actual duration of the opening of the fuel injection valve 12.

In this way, the delay time Td is subtracted from the injection signals having respectively pulse widths $T_1$ and $T_2$ thus generating the pulse signals respectively having pulse widths $t_1$ and $t_2$. The pulse signal is then delivered to an output terminal 30b from which it is applied to an input terminal 50b of the conversion frequency divider 50.

Figure 4:
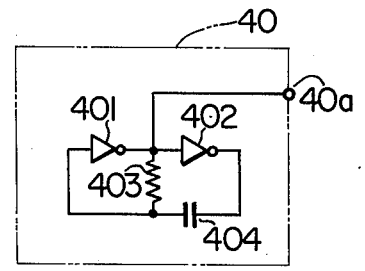
FIG. 4 is a circuit diagram showing the detailed construction of the oscillation circuit used in the embodiment of FIG. 1.

In FIG. 4, there is illustrated a circuit diagram showing the detailed construction of the oscillation circuit 40 for generating conversion reference pulses. The oscillation circuit 40 comprises two NOT gates 401 and 402 and oscillation frequency presetting resistor 403 and capacitor 404. The capacitor 404 is connected between the output of the NOT gate 402 and the input of the NOT gate 401, the resistor 403 is connected between the input and output of the NOT gate 401, the output of the NOT gate 401 is connected to the input of the NOT gate 402, and the output terminal 40a is connected to the output of the NOT gate 401. The oscillation frequency of the oscillation circuit 40 is preset by adjusting the resistance value of the resistor 403 and the capacitance of the capacitor 404 to generate conversion reference pulses having a frequency $f_o$, and these conversion reference pulses are applied to the input terminal 50a of the conversion frequency divider 50 through the output terminal 40a.

Figure 5:
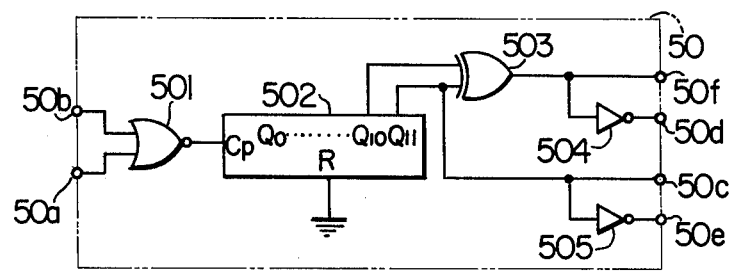
FIG. 5 is a circuit diagram showing the detailed construction of the conversion frequency divider used in the embodiment of FIG. 1.
Figure 6:
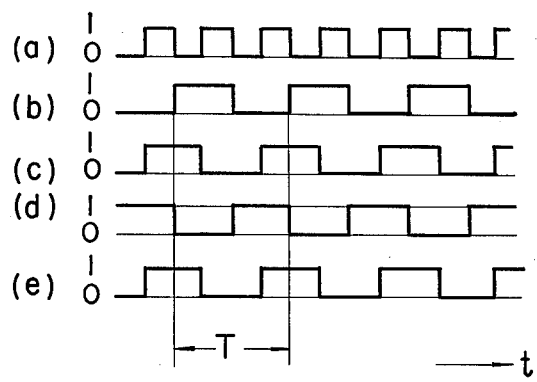
FIG. 6 is a diagram showing the waveforms generated at various points in the conversion frequency divider shown in FIG. 5.

FIG. 5 illustrates a circuit diagram showing the detailed construction of the conversion frequency divider 50, and FIG. 6 shows the waveforms generated at various points in the conversion frequency divider 50. Referring to FIGS. 5 and 6, as mentioned earlier, the pulse signal generated from the correction circuit 30 is applied to the input terminal 50b and the conversion reference pulses having the frequency $f_o$ and generated from the oscillation circuit 40 are applied to the input terminal 50a. Consequently, when the 0 level pulse having the time width $t_1$ corresponding to the pulse width $T_1$ of the injection signal from the EFI 10 minus the operating delay time Td is applied to the input terminal 50b, that is, during the time period $t_1$, the conversion reference pulses having the frequency $f_o$ and introduced through the input terminal 50a are passed through a NOR gate 506 as modulated signals. These modulated signals are applied to a clock terminal $C_p$ of a frequency divider 502 for frequency division. The frequency divider 502 may for example be the MOS IC 4020 manufactured by Radio Corporation of America (RCA), U.S.A., and the divided signals having respectively the waveforms shown in FIGS. 6a and 6b are respectively generated at its output terminals $Q_{10}$ and $Q_{11}$ since its reset terminal R is grounded. In other words, the modulated signal pulses applied to the clock terminal $C_P$ are subjected to a $½^{11}$ frequency division and the resulting divided pulses are generated at the output terminal $Q_{11}$ of the frequency divider 502. In the present embodiment, one cycle of the signals at the output terminal $Q_{11}$ corresponds to the fuel consumption of 2 (= 10/5)cc. In other words, each of the conversion reference pulses of the frequency $f_o$ generated from the oscillation circuit 40 corresponds to 2 × (1/2¹¹)cc, and if the oscillation frequency $f_o$ of the oscillation circuit 40 is selected so that the time width $t_1$ of for example 2 msec corresponds to 40 × 10⁻³ cc, then the frequency $f_o$ becomes 20.48 KHz. In this embodiment, pulses are in that way generated at the output terminal 50c connected to the output terminal $Q_{11}$ of the frequency divider 502 and each of these pulses corresponds to 2cc. The output terminals $Q_{10}$ and $Q_{11}$ of the frequency divider 502 are also connected to an EXCLUSIVE OR gate 503 (hereinafter simply referred to as an EX-OR gate) so that the output signal of the EX-OR gate 503 has the waveform shown in FIG. 6e and this output signal is generated at the output terminal 50f. On the other hand, the waveform shown in FIG. 6c is generated at the output terminal 50d of a NOT gate 504 which inverts the phase of the output signal of the EX-OR gate 503, and the signal having the waveform shown in FIG. 6d is generated at the output terminal 50e of a NOT gate 505 which inverts the phase of the signal generated at the output terminal $Q_{11}$ of the frequency divider 503. Consequently, the signals having the voltage waveforms shown in FIGS. 6b, 6c, 6d and 6e are respectively generated at the output terminals 50c, 50d, 50e and 50f and the period of these signals is T. The signals having the waveforms shown in FIGS. 6b, 6c, 6d and 6e are applied to the pulse motor 60 so that the rotating shaft 60a of the pulse motor 60 is rotated 1/5 of a revolution or 4 steps/20 steps by the four pulses appearing at the output terminals 50c, 50d, 50e and 50f. The auxiliary pointer 70a directly connected to the rotating shaft 60a also rotates the same number of degrees. On the other hand, the shaft to which the main pointer 70b is connected is caused by the memory gear means 70 to rotate 1/8000 of a revolution for every complete rotation of the rotating shaft 60a. The main pointer 70b indicates the fuel quantity consumed, and every ¾ of a revolution of the main pointer 70b results in a fuel consumption indication of 60 liters.

The operation of the embodiment described above will now be summarized. Assume now that the fuel tank of the vehicle has been filled with fuel and both the main pointer 70b and the auxiliary pointer 70a have been returned to the zero position. When the internal combustion engine of the vehicle comes into operation in this condition, the fuel in the fuel tank is forced out at a high pressure through the fuel pump so that when the fuel injection valve 12 is opened, the fuel is injected into and consumed by the engine. While the quantity of the fuel consumed during this injection time is dependent on the duration of the opening of the fuel injection valve 12 and the fuel pressure, since the ordinary EFI 10 employs a predetermined fuel pressure, the fuel quantity consumed is proportional to the duration of the opening of the fuel injection valve 12. As a result, the injection signal applied from the control circuit 11 of the EFI 10 to the fuel injection valve 12 to determine the duration of the opening thereof is taken off through the external terminal 20 to measure the duration of the valve opening. In other words, each time a single injection signal pulse is generated, the delay time in the operation of the fuel injection valve 12 is subtracted from the duration time of the injection signal pulse by the delay circuit 30 thus generating a pulse signal corresponding to the actual duration of the opening of the fuel injection valve 12. This pulse signal is then applied to the conversion frequency divider 50 so that the pulse signal is modulated with the conversion reference pulses generated from the oscillation circuit 40 and the modulated signals are frequency-divided. Consequently, each time the fuel quantity consumed amounts to 2 cc, four pulses of different phases are sequentially generated at the output terminals 50c, 50d, 50e, and 50f; and the pulse motor 60 is rotated four steps for every cycle of the four pulses. When the quantity of fuel consumed reaches 10 cc, the pulse motor 60 completes one revolution and the revolution is transmitted to the auxiliary pointer 70a through the rotating shaft 60a and the memory gear means 70. Consequently, the auxiliary pointer 70a completes a single revolution every time the quantity of fuel consumed reaches 10 cc. When the number of revolutions of the auxiliary pointer 70a reaches 6,000 revolutions, the main pointer 70b is rotated ½ of a revolution thus indicating that the fuel quantity consumed has reached 60 liters, i.e., the fuel has run out. Therefore, it is necessary for the driver to refuel the fuel tank whenever the amount of the rotation of the main pointer 70b reaches ½ of a revolution, and at the same time the main pointer 70b and the auxiliary pointer 70a are manually returned to the zero position thus placing the device in condition for starting the measurement of the subsequent fuel consumption. While the fuel quantity consumed can always be measured and indicated in the manner described above, this device is not limited to the measurement of the fuel quantity consumed, since the device can be readily adapted for many other applications. For example, by equipping the main pointer 70b with a graduated scale so that the value indicated on the scale decreases as the degree of rotation of the main pointer 70b increases, it is possible to measure and indicate the amount of the remaining fuel in the tank.

Figure 7:
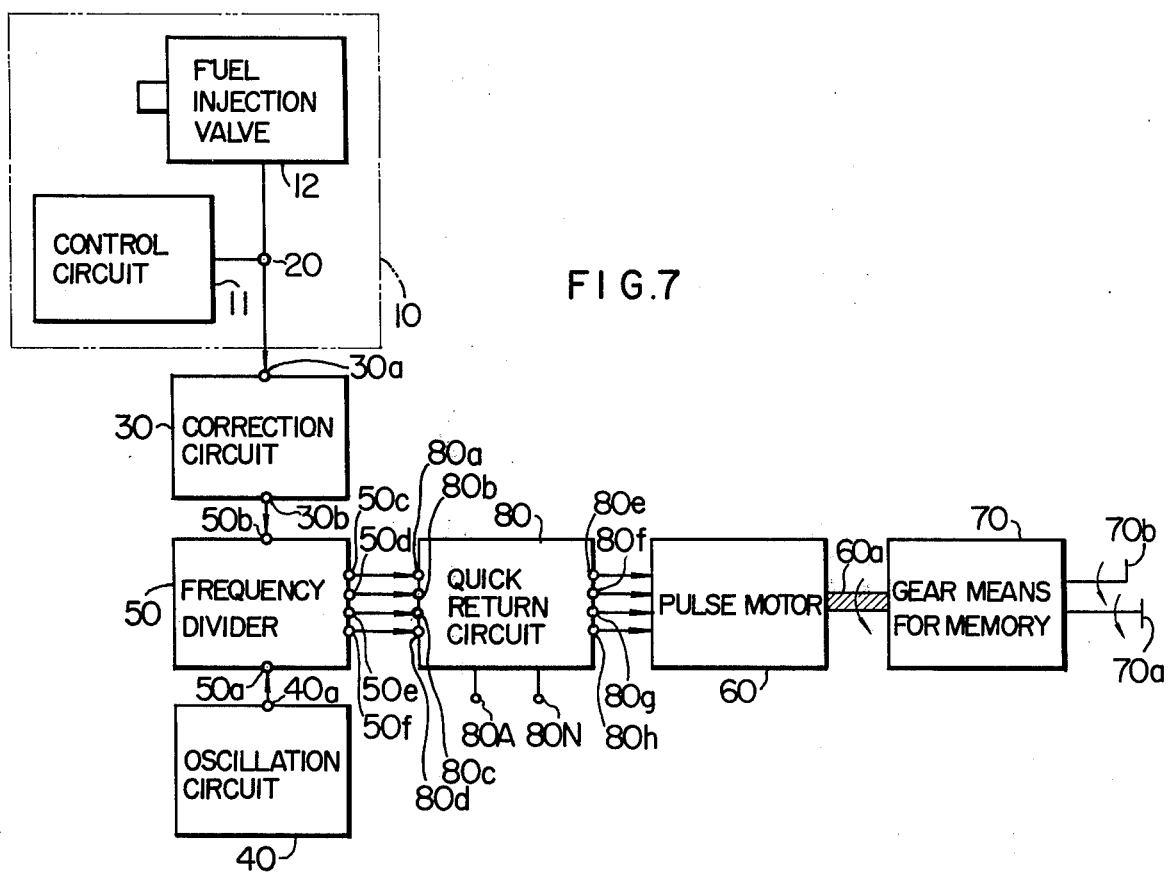
FIG. 7 is a block diagram showing another embodiment of the fuel consumption measuring device according to the present invention.

Referring now to FIG. 7, there is illustrated a block diagram of another embodiment of the device according to the invention. This embodiment differs from the first embodiment of FIG. 1 in that a quick return circuit 80 is provided between the conversion frequency divider 50 and the pulse motor 60 so that the conversion pulses from the conversion frequency divider 50 are passed through the quick return circuit 80 during the normal measuring period, whereas the pulse motor 60 is rotated in a reverse direction when the indications of the main pointer 70b and the auxiliary pointer 70a are reset to zero during, for example, the refueling of the fuel tank. In other words, the quick return circuit 80 has its input terminals 80a, 80b, 80c, and 80d respectively connected to the output terminals 50c, 50d, 50e and 50f of the conversion frequency divider 50 and its output terminals 80e, 80f, 80g and 80h connected to the pulse motor 60. Thus, a 0 level pulse is applied to a control terminal 80N for initiating the normal measurement, whereas a 0 level pulse is applied to a control terminal 80A for resetting the indications to zero, thus performing various controls.

Figure 8:
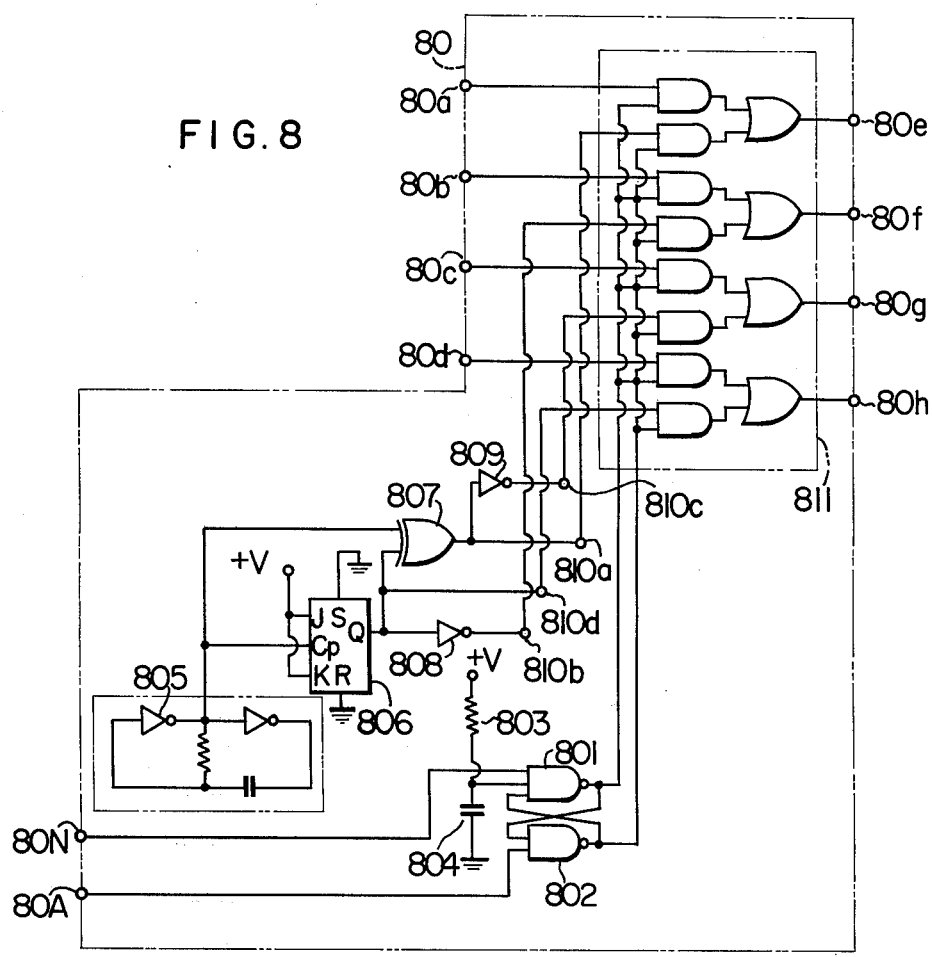
FIG. 8 is a circuit diagram showing the detailed construction of the quick return circuit used in the embodiment shown in FIG. 7.
Figure 9:
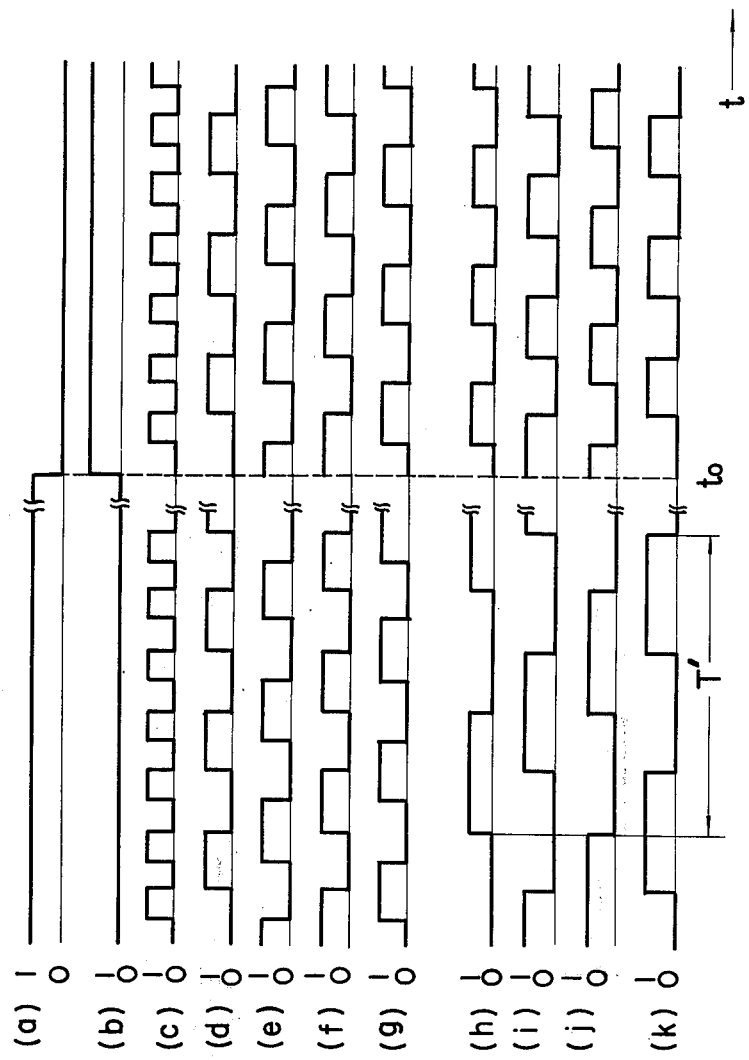
FIG. 9 is a diagram showing the waveforms generated at various points in the quick return circuit shown in FIG. 8.

FIG. 8 is a circuit diagram showing the detailed construction of the quick return circuit 80, and the waveforms generated at various points in the quick return circuit 80 are shown in FIG. 9. In FIG. 8, numerals 801 and 802 designate NAND gates constituting an R-S flip-flop for memorizing that a 0 level pulse has been applied to the control terminal 80N or 80A, so that the R-S flip-flop is set to allow the ordinary measuring operation when a 0 level pulse is applied to the control terminal 80N, whereas the quick return operation is performed when a 0 level pulse is applied to the control terminal 80A. Numerals 803 and 804 designate respectively a resistor and a capacitor for setting the R-S flip-flop when the power circuit is closed. Numeral 805 designates an oscillation circuit which generates output pulses for providing quick return pulses and which is identical in construction with the oscillation circuit 40. Thus, the function of this oscillation circuit may be concurrently performed by the oscillation circuit 40. Numeral 806 designates a J-K flip-flop for dividing the frequency of the oscillator pulses by a factor of 2, in which the oscillator pulses are applied to a $C_p$ terminal, a positive supply voltage is applied to J and K terminals, and R and S terminals are grounded thus generating the divided pulses at a Q terminal. Numeral 807 designates an Exclusive OR gate for performing the exclusive OR operation on the oscillator pulses and the divided pulses, 808 a NOT gate for inverting the phase of the divided pulses, 809 a NOT gate for inverting the phase of the output pulses of the Exclusive OR gate 807. The elements designated by the numerals 805 through 809 constitute a circuit which repeats the operation of sequentially generating pulses at terminals 810d, 810c, 810b and 810a in this order and providing quick return pulses. Numeral 811 designates a selection circuit for selecting either the conversion pulses applied from the conversion frequency divider 50 to the input terminals 80a, 80b, 80c, and 80d or the quick return pulses generated at the terminals 810a, 810b, 810c and 810d and applying the selected pulses to the pulse motor 60 through the output terminals 80e, 80f, 80g and 80h, whereby the conversion pulses from the conversion frequency circuit 50 are passed to the pulse motor 60 and the quick return pulses are blocked when the R-S flip-flop comprising the NAND gates 801 and 802 is set, whereas the conversion pulses are blocked and the quick return pulses are passed when the R–S flip-flop is reset.

With the construction described above, the operation of the second embodiment will now be described with reference to the waveform diagram of FIG. 9 in which the normal measuring operation is performed before a time $t_o$ and the quick return operation is performed after the time $t_o$.

During the normal measuring operation prior to the time $t_o$ in FIG. 9, the R-S flip-flop is set so that the output signal of the NAND gate 801 goes to a 1 level as shown in FIG. 9a and the output signal of the other NAND gate 802 goes to a 0 level as shown in FIG. 9b. At this time, the oscillation circuit 805 generates the output pulses shown in FIG. 9c thus generating the quick return pulses respectively shown in FIGS. 9d, 9e, 9f and 9g at the terminals 810d, 810c, 810b and 810a, respectively, through the circuit comprising the J-K flip-flop 806, the Exclusive OR gate 807 and the NOT gates 808 and 809. However, these quick return pulses are blocked by the selection circuit 811 and the signals applied to the input terminals 80a, 8b, 80c and 80d are passed through the selection circuit 811 thus generating at the output terminals 80e, 80f, 80g and 80h the signals shown in FIGS. 9h, 9i, 9j and 9k and having the same waveforms as the conversion pulses from the conversion frequency divider 50. Consequently, the following pulse motor 60 is rotated in accordance with the fuel quantity consumed.

During the quick return operation taking place after the time $t_o$ in FIG. 9, when the R-S flip-flop is reset, the output signal of the NAND gate 801 goes to the 0 level as shown in FIG. 9a and the output signal of the other NAND gate 802 goes to the 1 level. Consequently, the selection circuit 811 blocks the passage of the signals applied to the input terminals 80a, 80b, 80c and 80d, but passes the quick return pulses respectively shown in FIGS. 9d, 9e, 9f and 9g and generated at the terminals 810d, 810c, 810b and 810a in the like manner as before the time $t_o$, thus generating at the output terminals 80e, 80f, 80g and 80h the signals shown in FIGS. 9h, 9i, 9j and 9k and having the same waveforms as the quick return pulses. These signal pulses are sequentially generated at the output terminals 80h, 80g, 80f and 80e in this order which is reverse of that of the measuring operation, and thus the pulse motor 60 is rotate in the reverse direction and is returned to the initial state. This quick return operation is automatically accomplished by applying a 0 level pulse to the control terminal 80A in association with the refueling operation as for example the main pointer 70b and the auxiliary pointer 70a are reset to the zero position upon refueling the fuel tank. Since this quick return operation should preferably be effected as quickly as possible, the oscillation frequency of the oscillation circuit 805 is selected so high that the frequency of the quick return pulses becomes higher than that of the conversion pulses from the conversion frequency divider 50. In other words, the return speed of the quick return operation may be preset as desired by adjusting the oscillation frequency of the oscillation circuit 805.

Figure 10:
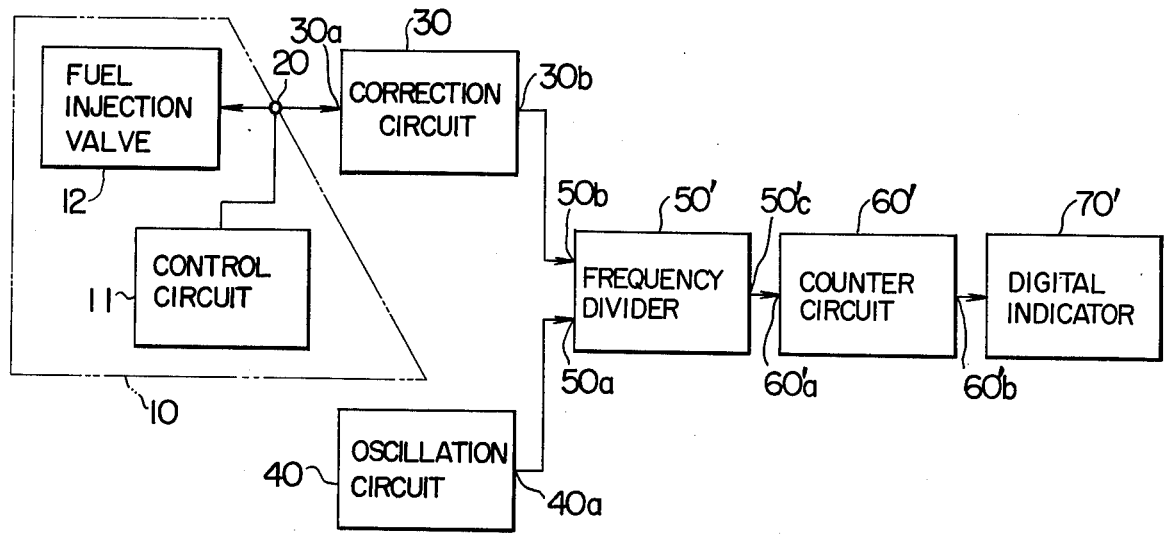
FIG. 10 is a block diagram showing another embodiment of a fuel consumption measuring device according to the present invention.

Referring now to FIG. 10, there is illustrated a block diagram showing the general construction of still another embodiment of the present invention in which the same reference numerals as used in FIGS. 1 and 7 designate the identical or equivalent component elements.

In FIG. 10, numeral 50' designates a conversion frequency divider wherein the pulse signal applied to the input terminal 50b is modulated by the conversion reference pulses applied to the input terminal 50a, whereby each time the number of the conversion reference pulses reaches a predetermined value, a conversion pulse train is generated at an output terminal 50'c thus converting the pulse signal into the amount of fuel fed. The oscillation circuit 40 and the conversion frequency divider 50' constitute a conversion circuit whereby in accordance with the input pulse signal the duration of the opening of the fuel injection valve 12 is measured and converted into the fuel quantity delivered. This fuel quantity delivered represents the fuel quantity consumed. Numeral 60' designates a counter circuit for integrating the conversion pulses applied to an input terminal 60'a and generating at an output terminal 60'b the resulting total value in the form of 4-bit BCD codes, and the frequency of the oscillation circuit 40 and the number of frequency dividing stages of the conversion frequency divider 50' are preset so that one cycle of the conversion pulses represents the fuel consumption of for example 10 cc. Numeral 70' designates a digital indicator wherein each 4-bit BCD code applied from the output terminal 60'b of the counter circuit 60' is indicated as a decimal number, and the digital indicator 70' may indicate the fuel consumption in units of liter by indicating down to two places of decimals.

The operation of this embodiment will now be described along with a more specified description of the construction described above.

Figure 11:
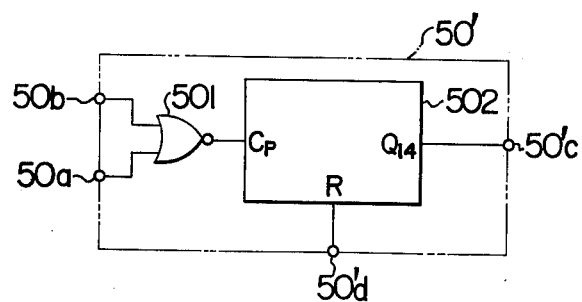
FIG. 11 is a circuit diagram showing the detailed construction of the conversion frequency divider used in the embodiment of FIG. 10.
Figure 12:
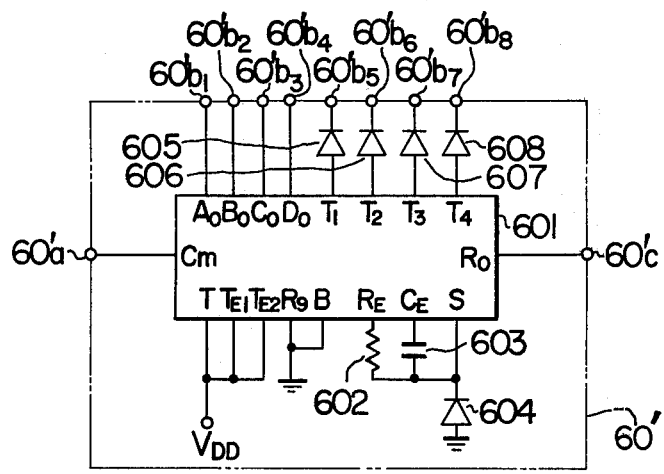
FIG. 12 is a circuit diagram showing the detailed construction of the counter circuit used in the embodiment of FIG. 10.
Figure 13:
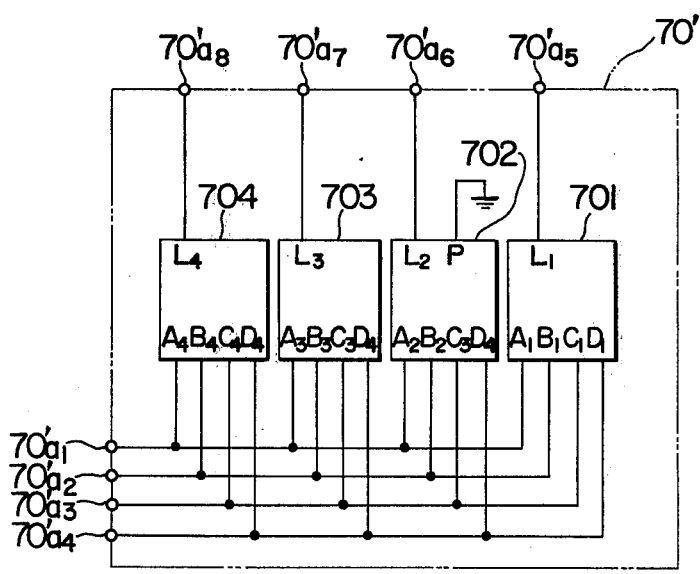
FIG. 13 is a circuit diagram showing the detailed construction of the digital indicator used in the embodiment of FIG. 10.

FIG. 11 illustrates a wiring diagram showing the detailed construction of the conversion frequency divider 50'. In FIG. 11, as mentioned earlier, the pulse signal generated from the correction circuit 30 is applied to the input terminal 50b and the conversion reference pulses having the frequency $f_o$ and generated from the oscillation circuit 40 are applied to the input terminal 50a. Consequently, when the 0 level pulse having the time width $t_1$ corresponding to the pulse width $T_1$ of the injection signal from the EFI 10 minus the operating delay time Td is applied to the input terminal 50b, that is, during the time period $t_1$, the conversion reference pulses having the frequency $f_o$ and introduced through the input terminal 50a are passed through a NOR gate 501' as modulated signals. These modulated signals are applied to a clock terminal $c_P$ of a frequency divider 502' for frequency division. The frequency divider 502' is the MOS IC CD4020 manufactured by the Radio Corporation of America (RCA) and its reset terminal R is normally held at the 0 level but it goes to the 1 level for resetting. Consequently, in the normal condition of the frequency divider 502', the divided pulses obtained by subjecting the modulated signal pulses applied to the clock terminal $C_P$ to a $\frac{1}{2}^{14}$ frequency division are generated at its output terminal $Q_{14}$ and one cycle of the pulses at the output terminal $Q_{14}$ corresponds to the fuel consumption of 10 cc. In other words, each of the conversion reference pulses of the frequency $f_o$ generated from the oscillation circuit 40 corresponds to $10 \times (\frac{1}{2}^{14})$ cc, and if the oscillation frequency $f_o$ of the oscillation circuit 40 is selected so that the time width $t_1$ of for example 2 msec corresponds to $40 \times 10^{-3}$ cc, then the frequency $f_o$ becomes 32.77 KHz. Thus, the conversion pulses each thereof corresponding to 10 cc are generated at the output terminal 50'c connected to the output terminal $Q_{14}$ of the frequency divider 502'. The conversion pulses are then applied to the input terminal 60'a of the counter circuit 60'. In FIG. 12, there is illustrated a detailed circuit diagram of the counter circuit 60'. Referring now to FIG. 12, the conversion pulses each thereof corresponding to 10 cc and applied to the input terminal 60'a are first supplied to an input Cm of an internal counter circuit 601 in the counter circuit 60'. The internal counter circuit 601 is the known MOS-IC TC-5001 manufactured by the Tokyo Shibaura Denki K.K. in which a reset terminal $R_o$ is connected to a reset switch through an output terminal 60'c so that the reset terminal $R_o$ is normally held at the 0 level and it goes to the 1 level for resetting purposes. On the other hand, a transfer terminal T, a test 1 terminal $TE_1$ and a test 2 terminal $TE_2$ are connected to a power supply $V_{DD}$, and a reset 9 terminal $R_9$ and a blanking terminal B are grounded. An external resistor terminal RE, an external capacitor terminal CE and a scan input terminal S are time division oscillator forming terminals, while a resistor 602 is connected between the external resistor terminal RE and the scan input terminal S and a capacitor 603 is connected between the external capacitor terminal CE and the scan input terminal S. A diode 604 has its one end (anode) connected to the ground and the other end (cathode) connected to the scan input terminal S. BCD output terminals $A_o$, $B_o$, $C_o$ and $D_o$ are respectively connected to output terminals 60'$b_1$, 60'$b_2$, 60'$b_3$ and 60'$b_4$. Digit position selection output terminals $T_1$, $T_2$, $T_3$ and $T_4$ are respectively connected to the inputs of NOT gates 605, 606, 607 and 608 whose outputs are connected to output terminals 60'$b_5$, 60'$b_6$, 60'$b_7$ and 60'$b_8$. In FIG. 7, there is illustrated a detail circuit diagram of the digital indicator 70'. Referring now to FIG. 13 showing the digital indicator 70', the output terminals 60'$b_1$, 60'$b_2$, 60'$b_3$ and 60'$b_4$ are respectively connected to input terminals 70'$a_1$, 70'$a_2$, 70'$a_3$ and 70'$a_4$ of the digital indicator 70'. The output terminals 60'$b_5$, 60'$b_6$, 60'$b_7$ and 60'$b_8$ of the counter circuit 60' are respectively connected to input terminals 70'$a_5$, 70'$a_6$, 70'$a_7$ and 70'$a_8$. The digital indicator 70' comprises four units of the known light emitting diode digital displays 5082-7302 manufactured by the Yokokawa Hewlett Packard K.K. Consequently the input terminal 70'$a_1$ is connected to BCD input terminals $A_1$, $A_2$, $A_3$ and $A_4$ of internal light emitting diode digital displays 701, 702, 703 and 704. Similarly, the input terminal 70'$a_2$ is connected to BCD input terminals $B_1$, $B_2$, $B_3$ and $B_4$ of the internal light emitting diode digital displays 701, 702, 703 and 704, the input terminal 70'$a_3$ to BCD input terminals $C_1$, $C_2$, $C_3$ and $C_4$ of the internal light emitting diode digital displays 701, 702, 703 and 704 and the input terminal 70'$a_4$ to BCD input terminals $D_1$, $D_2$, $D_3$ and $D_4$ of the internal light emitting diode digital displays 701, 702, 703 and 704. The input terminal 70'$a_5$ is connected to a lutch terminal $L_1$ of the digital display 701, the input terminal 70'$a_6$ to a lutch terminal $L_2$ of the digital display 702, the input terminal 70'$a_7$ to a lutch terminal $L_3$ of the digital dislay 703 and the input terminal 70'$a_8$ to a lutch terminal $L_4$ of the digital display 704. A point P of the light emitting diode digital display 702 is grounded. With the connections described, the number of pulses applied to the input terminal 60'a of the counter circuit 60' is indicated in a digital form by the digital indicator 70'. Since each of the input pulses corresponds to 10 cc, the input pulses are displayed in units of liter down to two places of decimals. For instance, when the number of pulses applied to the input terminal 60'a reaches 250, the digital indicator 70' gives an indication of 2.50 liters.

The operation of the embodiment described above will now be summarized. When the fuel tank of an automobile is refueled to fill it up, the reset switch is depressed thus causing the digital indicator 70' to give an indication of 0 liter. When the internal combustion engine of the automobile comes into operation in this condition, the fuel in the fuel tank is delivered under high pressure by the fuel pump so that the fuel is injected into and consumed by the engine each time the fuel injection valve 12 is opened. While the fuel quantity consumed as the result of the fuel injection depends on the duration of the opening of the fuel injection valve 12 and the fuel pressure, the ordinary EFI 10 employs a constant fuel pressure and therefore the fuel quantity consumed is proportional to the duration of the opening of the fuel injection valve 12. Consequently the duration of opening of the valve 12 is measured by taking off through the external terminal 20 the injection signal applied from the control circuit 11 of the EFI 10 to the fuel injection valve 12 thus determining the duration of the opening thereof. In other words, each time a single injection signal pulse is generated, the correction circuit 30 deduces the operating delay time of the fuel injection valve 12 and generates a pulse signal corresponding to the actual duration of the opening of the duration of the valve 12. This pulse signal is applied to the conversion frequency divider 50' where the pulse signal is modulated by the conversion reference pulses generated from the oscillation circuit 40 and the resulting modulated signals are subjected to a frequency division. Then, each time the quantity of fuel consumed reaches 10 cc, a conversion pulse train is generated at the output terminal 50'c so that the pulse train is counted by the counter circuit 60' and the digital indicator 70' gives a fuel consumption indication of 0.01 liter. When the number of the generated pulses reaches 6,000, the digital indicator 70' displays the corresponding figure of 60.00 liters thus indicating that the fuel quantity consumed has reached 60 liters, that is, all the fuel in the tank has been consumed. Therefore, it is necessary for the driver to refuel the tank before the indicated figure of the digital indicator 70' reaches 60.00 liters, and each time the fuel tank is refueled the reset switch is depressed and this results in a fuel consumption indication of 0 liter by the digital indicator 70' thus placing the digital indicator 70' in condition for the next measurement of the fuel consumption. In this way, the fuel quantity consumed is always measured and indicated with high accuracy.

Further, since the digital indications are employed, in addition to resetting the digital indicator to 0 liter by the reset switch upon refueling the fuel tank, it is possible to set the digital indicator to a value corresponding to the refueled fuel quantity, that is, if the refueled fuel quantity is 60 liters, then the digital indicator may be set to 60 liters so that the indicated value is successively reduced as the fuel is consumed and in this way the fuel remaining in the fuel tank is indicated. Further, by virtue of the digital indications, when the fuel gets low, it is possible to easily detect a signal from the BCD output terminals $60'b_1$, $60'b_2$, $60'b_3$ and $60'b_4$ of the counter circuit 60' and the output terminals $60'b_5$, $60'b_6$, $60'b_7$ and $60'b_8$ of the NOT gates to actuate other warning means.

Furthermore, in addition to light emitting diode digital displays, liquid crystal readouts, plasma displays, discharge display tubes, electroluminescent display plates or lamps may be employed.

The present invention is not limited to a fuel consumption measuring device adapted for use as a fuel gauge for automobile vehicles, since it can be adapted for various applications where fuel is injected and fed through the opening and closing of a fuel injection valve.

While, in the embodiments described above, the EFI 10 is provided with the single fuel injection valve 12, a plurality of such fuel injection valves may be employed in which case it is necessary to add up the duration of the opening of the individual valves or multiply by a constant corresponding to the number of the fuel injection valves as a conversion constant of the conversion circuit.

Further, while the conversion circuit of a digital type has been illustrated and disclosed which includes the oscillation circuit 40 for generating conversion reference pulses and the conversion frequency divider 50 for generating conversion pulses converted into the fuel quantity delivered, the present invention is not limited to the details shown since any other conversion circuit of a digital type or analog type may be equally employed provided that the corresponding conversion pulse train is generated each time the pulse width of the input pulse signal attains a predetermined value.

Still further, while the means for providing the above-mentioned pulse signal has been illustrated and disclosed as including the external terminal 20 for taking off injection signals and the correction circuit 30 responsive to the opening of the fuel injection value 12 for subtracting the delay time in the operation of the valve 12 from the duration time of the injection signal to generate the pulse signal, it is possible to directly detect the opening of the fuel injection valve and generate a pulse signal having a time width corresponding to the duration of the opening of the valve, or alternately another type of arrangement may be used in which the injection signal is directly used as the required pulse signal and the subtraction of the delay time in the operation of the fuel injection valve 12 is accomplished by effecting the subtraction in the conversion circuit each time the number of opening operations of the fuel injection valve 12 reaches a predetermined value.

Still further, while, the output signal of the conversion circuit is simply indicated to indicate the fuel quantity consumed, the device may further include for example a vehicle speed sensor so that the distance traveled by the vehicle is indicated in cyclic units corresponding to the predetermined fuel consumption of the output signals of the conversion circuit, thus making it possible to use the device as a fuel consumption rate meter.

Still further, the pulse motor 60 employed in the illustrated embodiments is not limited to the details shown, since the pulse motor 60 may be of any type provided that it is rotated in response to each of the applied conversion pulses, and it is also possible to eliminate the auxiliarily pointer 70a which indicates the fuel quantity consumed at every moment of time in accordance with the rotation of the pulse motor 60 and to directly connect only the main pointer 70b to the pulse motor 60 so as to indicate the fuel quantity consumed by the engine.

It will thus be seen from the foregoing description that the device according to the present invention has among its great advantages the fact that by virtue of the provision of means responsive to the opening of a fuel injection valve for generating a pulse signal having a pulse width corresponding to the duration of the opening of the valve and a conversion circuit wherein the duration of the opening of the valve is measured and converted into the fuel quantity delivered in accordance with the pulse signal by generating a conversion pulse train each time a predetermined value is reached, instead of directly detecting the level of the fuel in the fuel tank as is the case with the conventional fuel gauge, the fuel quantity delivered or the fuel quantity consumed is indirectly measured in accordance with the duration of the opening of the fuel injection valve with the result that the amount of power consumed in measurement is reduced and the effects of external factors which tend to cause variations of the fuel level independently of the consumption of fuel are eliminated, thus always ensuring an accurate measurement of the fuel quantity consumed or the amount of the remaining fuel in the fuel tank.

Another great advantage of the device of this invention is the use of a conversion circuit including an oscillation circuit for generating conversion reference pulses of a predetermined frequency for conversion purposes and a conversion frequency divider wherein the pulse signal is modulated with the conversion reference pulses and a conversion pulse train converted into a predetermined fuel feed quantity is generated each time the number of the conversion reference pulses reaches a predetermined value, with the result that the fuel quantity consumed can be measured in unit quantities with a simple digital arrangement.

Still another great advantage of the device of the invention is the use of indicating means for indicating the fuel quantity delivered in accordance with the conversion pulses from the conversion circuit, with the result that the fuel quantity consumed can always be monitored accurately.

Still another great advantage of the device of the invention is the use of a pulse motor which is rotated in steps in response to the conversion pulses and pointers each adapted for indicating the fuel quantity delivered in accordance with the rotation of the pulse motor, with the result that the digital conversion pulses can be directly converted into a mechanical displacement, and moreover the indication of the device can always be provided independently of the connection or disconnection of the power source.

Still another great advantage of the device of the invention is the use of a quick return circuit which in accordance with the required operation prevents the passage of the conversion pulses or generates quick return pulses for operating the pulse motor in the reverse direction, with the result that the pointers can be automatically reset to their initial positions upon refueling the fuel tank, for example.

What is claimed is:

1. A fuel consumption measuring device for use in combination with a fuel injection system of the type in which the opening and closing of a fuel injection valve for intermittently injecting fuel to an internal combustion engine is controlled in accordance with fuel injection time signals to thereby control the amount of fuel fed to said engine, said combustion measuring device comprising:

means responsive to the opening of said fuel injection valve for generating a fuel opening time signal having a pulse width equal to the duration of the opening of said fuel injection valve;

an oscillation circuit for generating reference pulse signals having a predetermined frequency;

means connected to said oscillation circuit and said valve opening time signal generating means for gating said reference pulse signals during the time duration of the opening of said fuel injection valve;

means for dividing said gated reference pulses, a pulse motor connected to said dividing means, said pulse motor being rotatable in steps in response to the output of said dividing means;

a unit fuel consumption pointer operatively coupled to said pulse motor for cyclicly rotating to indicate consumption of said predetermined fuel quantity, a total fuel amount pointer for indicating either the remanent fuel amount or the fuel consumption amount, and means coupling said total fuel amount pointer to said pulse motor for maintaining the position of said total fuel amount pointer when said fuel injection system is not operative.

2. A device according to claim 1, wherein said valve opening time pulse signal generating means includes a delay circuit connected to said fuel injection valve for making a correction for a delay time in the operation of said fuel injection valve and for generating said valve opening time pulse signal.

3. A device according to claim 1 further comprising a quick return circuit means connected to said frequency dividing means and said pulse motor, whereby the passage of said pulse signals to said pulse motor is selectively prevented, and means for generating quick return pulse signals to operate said pulse motor in a reverse direction.

4. A device according to claim 3, wherein said valve opening time pulse signal generating means includes a delay circuit connected to said fuel injection valve for making a correction for a delay time in the operation of said fuel injection valve and for generating said valve opening time pulse signal.

* * * * *